(12) United States Patent
Dessertenne (10) Patent No.: US 9,002,953 B2
(45) Date of Patent: Apr. 7, 2015

(54) METHOD AND DEVICE FOR CONCENTRATING MESSAGES FOR THE INTEGRATION SIMULATION OF COMPONENTS

(75) Inventor: Franck Dessertenne, Colomiers (FR)

(73) Assignee: Airbus Operations S.A.S., Toulouse (FR)

( * ) Notice: Subject to any disclaimer, the term of this patent is extended or adjusted under 35 U.S.C. 154(b) by 1079 days.

(21) Appl. No.: 12/635,093

(22) Filed: Dec. 10, 2009

(65) Prior Publication Data

US 2010/0211647 A1 Aug. 19, 2010

(30) Foreign Application Priority Data

Dec. 10, 2008 (FR) ..................................... 08 58444

(51) Int. Cl.
| | |
|---|---|
| *G06F 15/16* | (2006.01) |
| *H04L 12/24* | (2006.01) |
| *H04L 12/801* | (2013.01) |
| *H04L 12/815* | (2013.01) |
| *H04L 12/18* | (2006.01) |

(52) U.S. Cl.
CPC .............. *H04L 41/145* (2013.01); *H04L 47/10* (2013.01); *H04L 47/12* (2013.01); *H04L 47/225* (2013.01); *H04L 12/18* (2013.01)

(58) Field of Classification Search
CPC ...................................................... H04L 47/225
USPC ........................................................ 709/206
See application file for complete search history.

(56) References Cited

U.S. PATENT DOCUMENTS

| | | | |
|---|---|---|---|
| 2001/0055317 A1 | 12/2001 | Kajizaki et al. | |
| 2002/0181427 A1 | 12/2002 | Sparr et al. | |
| 2004/0252721 A1* | 12/2004 | Lingafelt et al. | 370/473 |
| 2005/0198040 A1 | 9/2005 | Cohen et al. | |
| 2005/0220111 A1* | 10/2005 | Mann et al. | 370/392 |
| 2005/0226150 A1* | 10/2005 | Santos et al. | 370/230 |
| 2006/0029099 A1* | 2/2006 | Jang et al. | 370/473 |
| 2007/0291795 A1* | 12/2007 | Munje | 370/498 |
| 2008/0095150 A1* | 4/2008 | Lee et al. | 370/389 |
| 2008/0095193 A1* | 4/2008 | Gaedke et al. | 370/473 |
| 2009/0129407 A1* | 5/2009 | Seal et al. | 370/473 |

FOREIGN PATENT DOCUMENTS

| | | |
|---|---|---|
| EP | 1 032 165 A1 | 8/2000 |
| EP | 1 104 141 A2 | 5/2001 |

\* cited by examiner

*Primary Examiner* — Hamza Algibhah
(74) *Attorney, Agent, or Firm* — Oblon, McClelland, Maier & Neustadt, L.L.P.

(57) ABSTRACT

A method and a device are disclosed for concentration of messages transmitted by at least two separate transmitters in a communication network to which there are connected these transmitters and an addressee of the data contained in the messages. After receiving the messages to be concentrated, the data contained in these messages are extracted. A concentration frame comprising the extracted data and at least one information item making it possible to identify the addressee is then constructed and transmitted The size of the concentration message is smaller than the maximum size of the data packets exchanged in the communication network.

5 Claims, 5 Drawing Sheets

| 305-1 | 310-1 | 315-1 | 320-1 | 325-1 | 330-1 |
|---|---|---|---|---|---|
| $ID_1$ | $L_1$ | $SN_1$ | $TS_1$ | $S_1$ | $SIG_1$ |

300-1

| 305-2 | 310-2 | 315-2 | 320-2 | 325-2 | 330-2 |
|---|---|---|---|---|---|
| $ID_2$ | $L_2$ | $SN_2$ | $TS_2$ | $S_2$ | $SIG_2$ |

300-2

| 305-3 | 310-3 | 315-3 | 320-3 | 325-3 | 330-3 |
|---|---|---|---|---|---|
| $ID_3$ | $L_3$ | $SN_3$ | $TS_3$ | $S_3$ | $SIG_3$ |

| 405 | 410 | 415 | 420 | 425 | 325-1 | 330-1 | 325-2 | 330-2 | 325-3 | 330-3 |
|---|---|---|---|---|---|---|---|---|---|---|
| $ID_{conc}$ | $L_{conc}$ | $SN_{conc}$ | $TS_{conc}$ | $S_{conc}$ | $S_1$ | $SIG_1$ | $S_2$ | $SIG_2$ | $S_3$ | $SIG_3$ |

| | | | | | 430 | 435 | | | | | | |
|---|---|---|---|---|---|---|---|---|---|---|---|---|
| $ID_{conc}$ | $L_{conc}$ | $SN_{conc}$ | $TS_{conc}$ | $S_{conc}$ | $S_0$ | $SIG_0$ | $S_1$ | $SIG_1$ | $S_2$ | $SIG_2$ | $S_3$ | $SIG_3$ |

METHOD AND DEVICE FOR CONCENTRATING MESSAGES FOR THE INTEGRATION SIMULATION OF COMPONENTS

This invention relates to the simulation of integration of components and more particularly to a method and a device for concentration of messages exchanged in a communication network comprising equipment items provided with expansion cards, used for the simulation of integration of components.

Simulation of the integration of components in a vehicle, in particular in an aircraft, is used especially to ensure the development and integration of the electronic and/or computer systems on board same.

Thus, the integration of components in vehicles is the subject of simulations according to which input/output devices, or input/output cards, are used as an interface between the real components of the vehicle, such as, for example, computers, sensors and drives, and a simulation environment generally comprising one or more computers used to simulate the performance of the vehicle or of a part thereof. Each input/output card has a given number of input paths and output paths.

The complexity of the simulation environment is linked to that of the set of components of the vehicle being used. In the field of aircraft, it generally is necessary to resort to several computers or servers to simulate the various situations which the components are likely to have to confront. A network, allowing communication between the various computers or servers and the input/output devices, generally is used.

The network formed in this way is, for example, of the "switch fabric" type, based on a switched architecture, that is, the terminal equipment items responsible for the transmission and reception of data are organized around switches responsible for the transport of these data. The switch is responsible for transmitting in parallel requests originating from computers or from servers to input/output cards and responses originating from input/output cards to the computers or servers. The same request and the same response must be able to be addressed by the switch to several addressees. A request/response pair forms a simulation cycle. Several request/response pairs can be managed in parallel.

The network used can be based on an existing standard, for example the Ethernet standard (IEEE 802.3) which describes a local network protocol with switching of packets.

Because of the number of components used in the simulation, it generally is necessary to utilize numerous input/output cards. These can be consolidated in one or more equipment items comprising a computation unit, generally used as a sole communication interface. Such an equipment item, also called rack in English terminology, typically comprises an industrial communication bus to which there are connected the computation unit, comprising a sole network interface, and a plurality of input/output cards, themselves connected to the components the integration of which is simulated.

Figure 1:
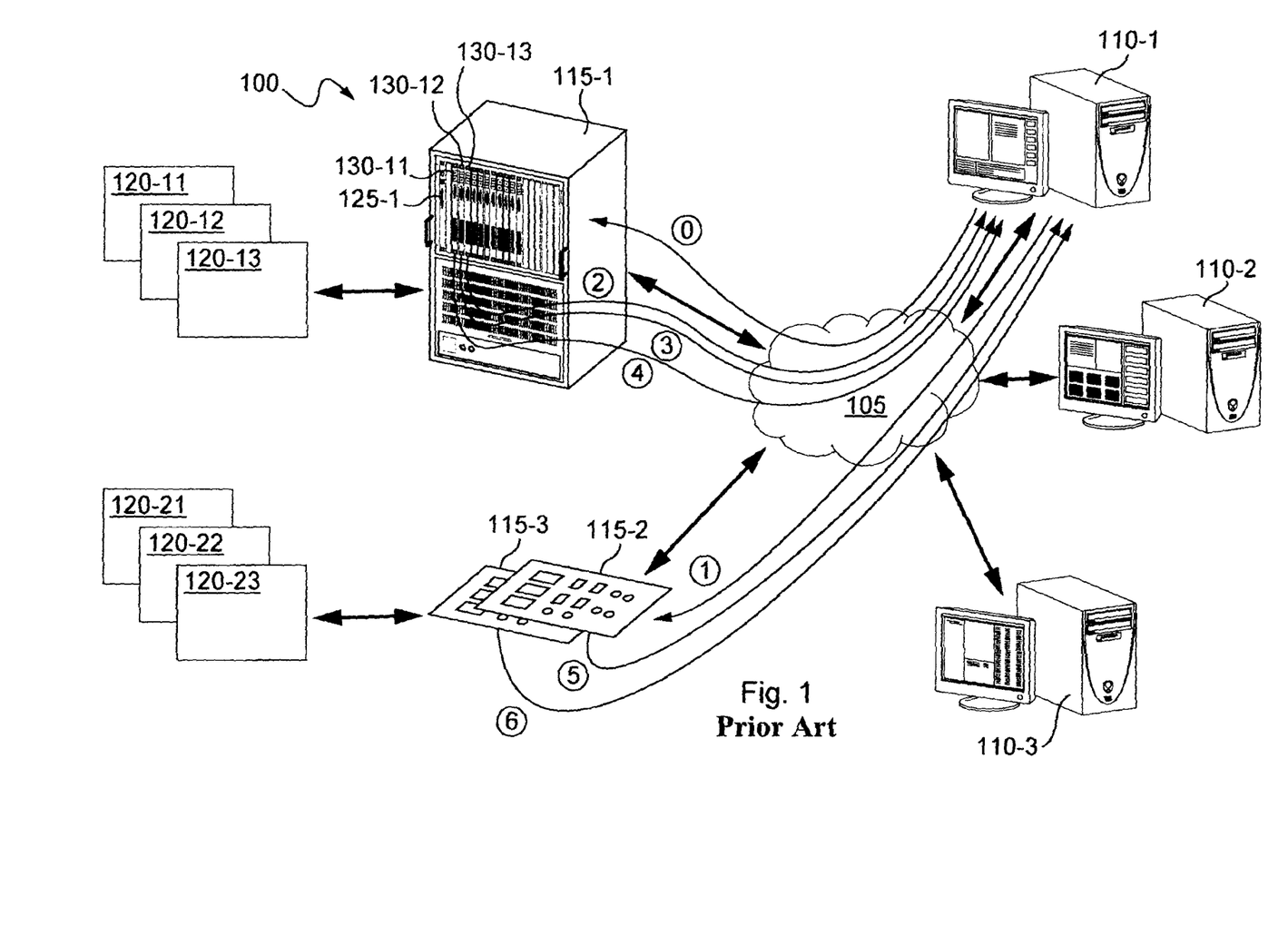
FIG. 1 shows an exemplary environment that can be used to simulate the integration of components in an aircraft.

FIG. 1 illustrates an exemplary environment that can be used to simulate the integration of components in an aircraft. Environment 100 here comprises a network 105 to which there are connected computers or servers 110-1 to 110-3, generically called computers in the remainder of the description, an equipment item 115-1 comprising several input/output cards and input/output cards 115-2 and 115-3. The components the integration of which is simulated here are components 120-11 to 120-13 and 120-21 to 120-23, generically referenced 120, connected to equipment item 115-1 and to input/output cards 115-2 and 115-3, respectively.

By way of illustration, equipment item 115-1 here comprises a computation unit 125-1, also called CPU (abbreviation for Central Processing Unit in English terminology), as well as 11 input/output cards, including input/output cards 130-11, 130-12 and 130-13.

The tools for testing and for simulation of the integration of components 120 are implemented on computers 110-1 to 110-3, each computer being able to implement one or more tools.

In order to test the integration of one or more components 120, an operator uses a test tool implemented on one of computers 110-1 to 110-3 in order to transmit data to one or more components 120 in the form of requests addressed to one or more input/output cards possibly via equipment item 115-1. The test results, obtained in the form of responses to the requests, are analyzed by the operator who in this way checks the progress of the simulation.

Communication between the computers and the input/output cards can be in accordance with the UDP (abbreviation for User Datagram Protocol in English terminology) protocol. In general, the computers use a multicast-type transmission mode, that is to say that a message is addressed simultaneously to several input/output cards, forming a group, while the input/output cards use a unicast-type transmission mode, that is to say a point-to-point communication mode, in order to respond to the messages received. Each computer and each input/output card preferably comprises a unique address making it possible to identify it on the communication network.

Thus, for example, computer 110-1 can transmit a first message to input/output cards 130-11, 130-12 and 130-13 and a second message to input/output cards 115-2 and 115-3, as illustrated by the references ⓪ and ①. In response to these two messages, computer 110-1 receives five separate messages from each of the input/output cards, as illustrated by the references ② to ⑥.

Nevertheless, because of the increasing number of input/output cards used in the simulations of integration of components, and consequently of the messages exchanged, the latent period induced on the computers as a result of the interruptions generated by the messages received must be taken into consideration.

The invention makes it possible to resolve at least one of the problems set forth above.

The invention thus has as an object a method for concentration of at least two messages transmitted by at least two separate transmitters in a communication network to which there are connected the said at least two transmitters and at least one addressee of at least one datum contained in each of the said at least two messages, the method comprising the following steps, receiving the said at least two messages;
extracting the said at least one datum contained in each of the said at least two messages;
constructing at least one concentration frame comprising the said extracted data and at least one information item making it possible to identify the said at least one addressee; and,
transmitting the said at least one concentration frame, the size of the said at least one concentration frame being smaller than the maximum size of the data packets exchanged in the said communication network.

In this way, the method according to the invention makes it possible to reduce the number of messages transmitted to the said at least one addressee and, consequently, the latent period induced by the interruptions generated in the network layer of the operating system of the said at least one addressee by the reception of the messages.

According to a specific embodiment, the method further comprises the following steps,
configuring the device implementing the method for storing the identifiers of the messages to be concentrated and the address of the said at least one addressee; and,
verifying the validity of the said at least two messages received.

The method according to the invention thus makes it possible to filter the messages to be transmitted to the said at least one addressee, in particular the messages that would not be valid.

The method according to the invention advantageously further comprises a step of opening a concentration window the size of which is predetermined, the said concentration window being open during reception of the first of the said at least two messages, the said at least one concentration frame being transmitted at the expiration of the said concentration window if at least one of the said at least two messages is not received.

In this way, the method according to the invention makes it possible to transmit only a part of the messages to be transmitted, in the form of a single message, if the entirety of the messages to be transmitted is not received.

The said at least one concentration frame preferably comprises a status indicator, the method comprising a step of evaluating the said status. The message transmitted to the said at least one addressee thus can comprise specific indications, in particular indications relating to the message transmitted.

According to a specific embodiment, the method is implemented in one of the said at least two transmitters or in a device separate from the said at least two transmitters and from the said at least one addressee. The method according to the invention thus can be implemented in one of the transmitters or in an independent device.

Again according to a specific embodiment, the said communication network is an Ethernet-type network, the said at least two messages and the said at least one concentration frame being in accordance with the UDP protocol.

The invention also has as an object a method for simulation of the integration of a plurality of components in a communication network comprising at least one simulation management system and at least two input/output-type expansion cards to which the said plurality of components is connected, the said method comprising a step of concentrating at least two messages intended for that said at least one simulation management system, the said at least two messages being transmitted by the said at least two expansion cards, the said concentration step being in accordance with the method described above.

The invention also has as an object a computer program comprising instructions adapted for the implementation of each of the steps of the method described above when the said program is executed on a computer.

The invention also has as an object a device comprising means adapted for the implementation of each of the steps of the method described above as well as an equipment item comprising at least one input/output-type expansion card, at least one network interface and at least the said device.

Other advantages, purposes and characteristics of this invention become apparent from the detailed description that follows, presented by way of non-limitative example, with reference to the attached drawings in which.

In general, the invention seeks to concentrate certain messages transmitted by separate devices, for example input/output-type expansion cards, on a communication network, intended for a single device, in order to limit the latent period induced on this device by the interruptions generated in the network layers of the operating system by the reception of these messages.

Figure 2:
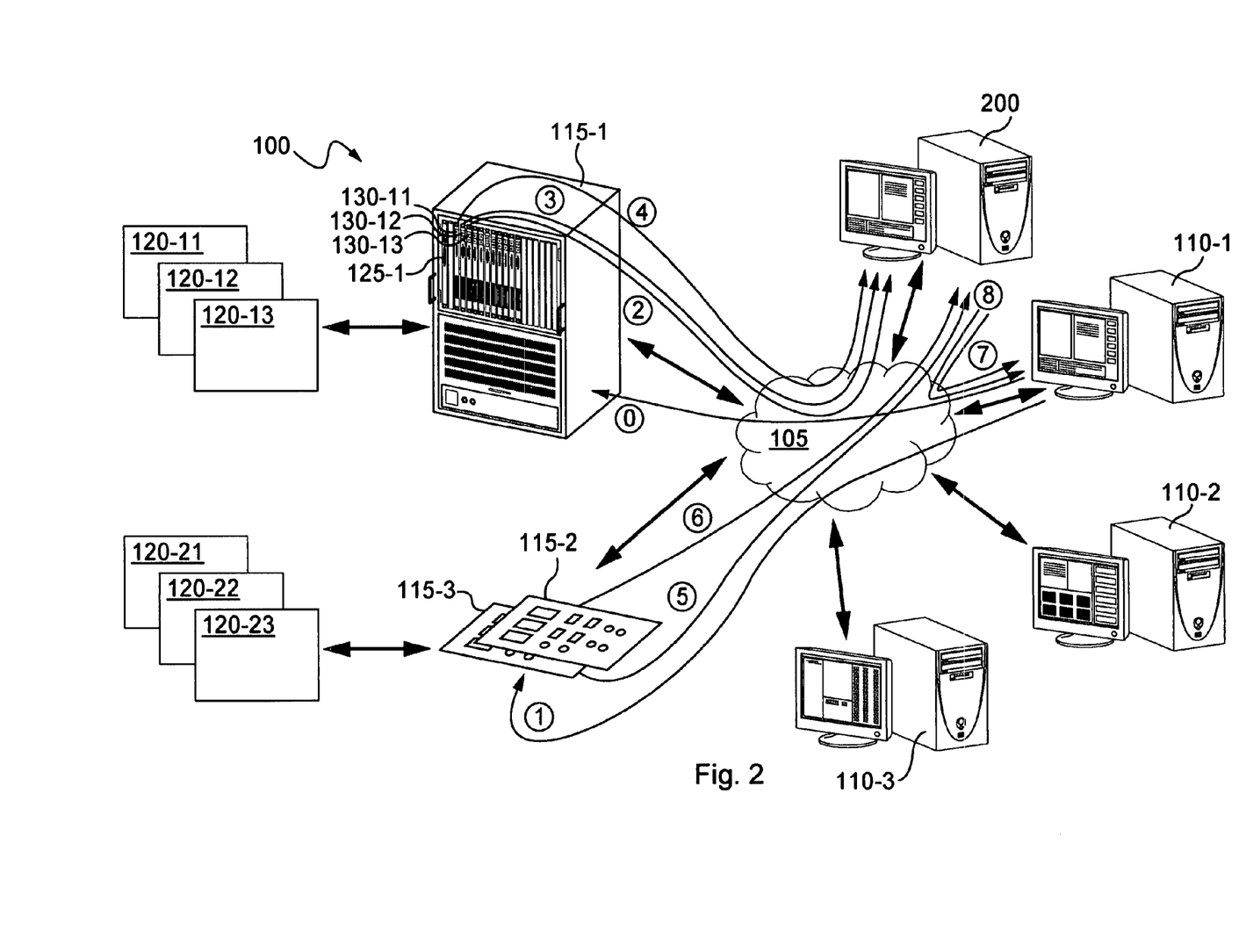
FIG. 2 illustrates an implementation of a message concentrator, in accordance with the invention, in a communication network used for the simulation of integration of components such as the one illustrated on FIG. 1.

FIG. 2 illustrates the implementation of a message concentrator 200, in accordance with the invention, in a communication network used for the simulation of integration of components such as the one illustrated on FIG. 1.

The function of concentrator 200 is in particular to receive certain messages intended for computer 110-1 in order to concentrate them in a single message, called concentration frame, which then is retransmitted to computer 110-1.

According to a specific embodiment, the concentration is carried out for each group of input/output cards, that is to say, for each multicast-type message transmitted.

Thus, for example, computer 110-1 can transmit a first message to input/output cards 130-11 to 130-13 and a second message to input/output cards 115-2 and 115-3, as shown with the references ⓪ and ①. In response to these two messages, the five messages transmitted by each of the input/output cards are transmitted to concentrator 200, as illustrated by the references ② to ⑥. The messages received in concentrator 200, intended for computer 110-1, are concentrated in two concentration frames that are transmitted to computer 110-1, as illustrated by the references ⑦ and ⑧.

In order that the messages transmitted by input/output cards 130-11 to 130-13, 115-2 and 115-3 intended for computer 110-1 may be addressed to concentrator 200, a special configuration step is implemented. This step makes it possible to establish a link between the identifiers of the messages exchanged and the addresses, for example the IP (abbreviation for Internet Protocol in English terminology) addresses, computer 110-1, input/output cards 130-11 to 130-13, 115-2 and 115-3 and concentrator 200.

In this way, an input/output card can determine, from the identifier of a message received from a computer, the address of the concentrator to which the response is to be addressed, as well as the identifier of the response message. Likewise, a concentrator can determine, from the identifier of a message received from an input/output card, the address of the computer to which the concentration frame is to be addressed, as well as the identifier of the frame to be used.

In general, the object of concentrator 200 is to concentrate a number n of messages the addressee of the content of which is a computer i in a number m of messages that actually are transmitted to the computer i, the number m being less than n. Furthermore, the number m preferably is determined in such a way that the size of each of the m messages is maximum but smaller than the MTU (abbreviation for Maximum Transmission Unit in English terminology) of the communication network, that is to say, smaller than or equal to the size of a message beyond which the message is fragmented by the fragmentation layers of the network.

Thus, the device that is to receive the n messages in reality receives only m messages. The reception of a smaller number of messages makes it possible to limit the number of interruptions generated in this device as well as the processing time for the messages received.

It should be noted that, while the concentrator can be an autonomous device, connected to the communication network as illustrated on FIG. 2, the concentrator also can be associated with input/output cards, for example in the form of a computation unit of an equipment item comprising input/output cards or be arranged as an interface between a communication network and one or more equipment items comprising input/output cards.

The computing capacity of the concentrator preferably is determined in such a way that the time for concentration of the messages is negligible in relation to the cycle time for exchanges of messages between the devices connected to the communication network.

According to a specific embodiment, the messages are exchanged in the form of UDP messages.

Figure 3:
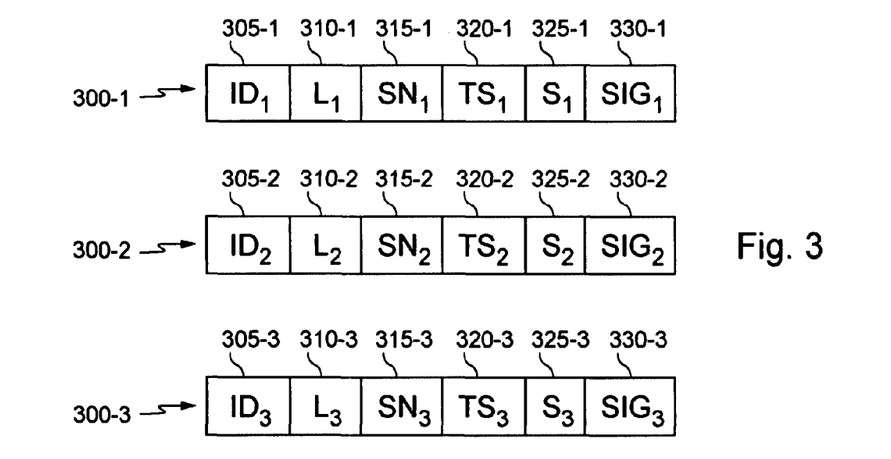
FIG. 3 shows an example of messages transmitted by three input/output cards in response to a message received from a computer.

FIG. 3 shows an example of messages transmitted by three input/output cards in response to a message received from a computer. Message 300-1 here is transmitted by a first input/output card, message 300-2 by a second and message 300-3 by a third.

Each of the messages comprises an identifier, marked ID and referenced 305-1, 305-2 and 305-3, used to identify the message. This identifier is used in particular to determine the data structure of the message. For example, identifier 100 can indicate a structure according to which the message contains the following information items: an engine speed coded in integer form on 32 bits, an altitude coded in integer form on 32 bits and a state of cockpit indicators coded in Boolean form on 8 bits. Although the final addressee of the response message is a computer used for the simulation, the addressee here is, because of the concentration configuration, a concentrator.

Each message also comprises an indication relating to its length, marked L and referenced 310-1, 310-2 and 310-3, a sequence number, marked SN (abbreviation for Sequence Number in English terminology) and referenced 315-1, 315-2 and 315-3, as well as a timestamp, also called timestamp in English terminology, marked TS and referenced 320-1, 320-2 and 320-3.

The sequence number preferably is incremented automatically at each simulation cycle; it makes it possible in particular to reconstruct the development of the simulation a posteriori, a simulation cycle being a period corresponding to the transmission of at least one request and to the reception of the associated response, as indicated above. Each pair formed by an identifier and a sequence number is unique in a simulation sequence.

The timestamp is an indication that makes it possible to determine the duration of validity of a message. If it is not transmitted within a predetermined time limit, the message is ignored. The timestamp corresponds, for example, to the instant when the multicast-type message to which it is being responded has been transmitted. The timestamp is placed in the request message by the system at the source of the message, just before transmitting same (before use of the send function of the UDP layer). The addressee then constructs its response by recopying this timestamp in the response message. The system at the source of the request message, receiving this response message, then can compare the current time at the moment of reception with the timestamp placed in the body of the message. The timestamp thus makes it possible to reject a response according to its life span.

It should be noted that for a group of input/output cards that can be addressed by a unique multicast-type message, the timestamp and the sequence number of the messages transmitted by each input/output card of the group are, by construction, identical.

Messages 300-1, 300-2 and 300-3 also comprise a status indication, marked S and referenced 325-1, 325-2 and 325-3, as well as the useful data, also called payloads in English terminology, marked SIG and referenced 330-1, 330-2 and 330-3, representing the signals measured by the input/output cards.

The status indication can be used in particular to specify the type of message.

Figure 4:
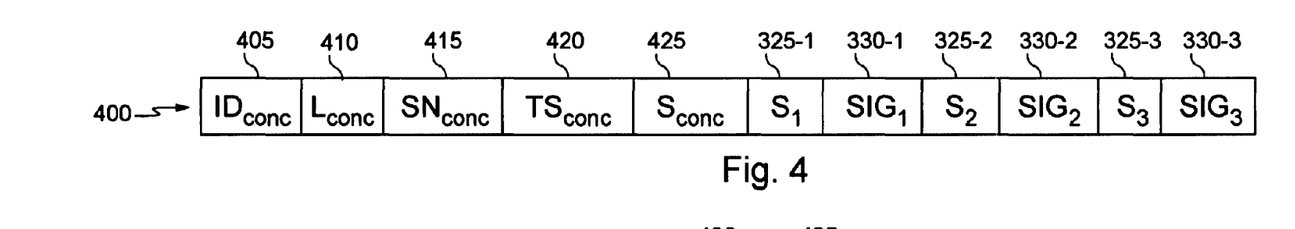
FIGS. 4 and 5 show examples of concentration frames the content of which is based on the messages illustrated on FIG. 3.

A concentrator, for example concentrator 200 illustrated on FIG. 2, makes it possible to concentrate messages 300-1, 300-2 and 300-3 of FIG. 3 in a single message, for example concentration frame 400 shown on FIG. 4.

Like messages 300-1, 300-2 and 300-3, concentration frame 400 comprises an identifier 405 making it possible in particular to identify the address of the addressee of the data contained in concentration frame 400.

Concentration frame 400 also comprises length 410 thereof, as well as a sequence number 415 and a timestamp 420. Sequence number 415 preferably is identical to sequence number 315-1, 315-2 and 315-3 of messages 300-1, 300-2 and 300-3. Likewise, timestamp 420 preferably is identical to timestamps 320-1, 320-2 and 320-3 of messages 300-1, 300-2 and 300-3. Nevertheless, if the latter are different, timestamp 420 advantageously is the same as the oldest timestamp among timestamps 320-1, 320-2 and 320-3 of messages 300-1, 300-2 and 300-3.

Concentration frame 400 further comprises a status 425 that is specific thereto. It can be determined, for example, according to the nature of each of messages 300-1, 300-2 and 300-3 contained in concentration frame 400. Status 425 also can be used to indicate an error in concentration of the messages.

Finally, concentration frame 400 comprises the status and the useful data of each of the concentrated messages, that is to say here statuses 325-1, 325-2 and 325-3 and useful data 330-1, 330-2 and 330-3.

Fields 405 to 425 thus are filled in by the concentrator while the other fields take up a part of the content of the concentrated messages.

Figure 5:
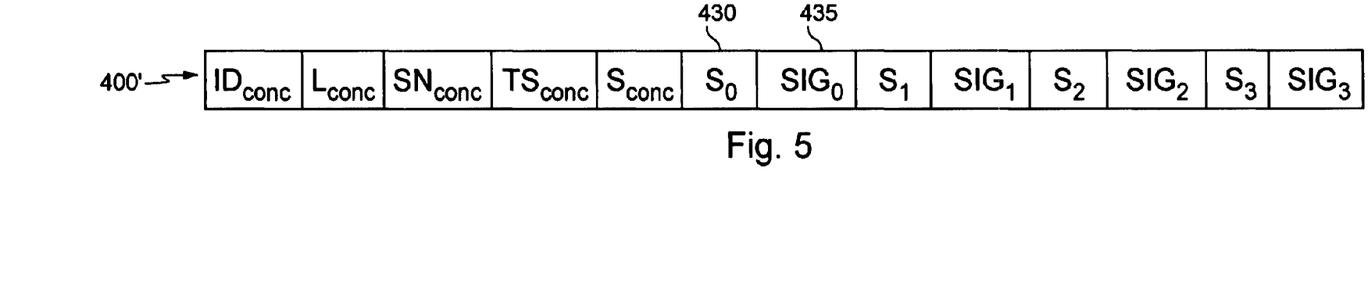

It should be noted that while the concentrator is associated with an input/output card or comprises an input/output card, a part of the message transmitted by the concentrator comprises its own data, for example status 430 and useful data 435 of concentration frame 400' shown on FIG. 5.

Figure 6:
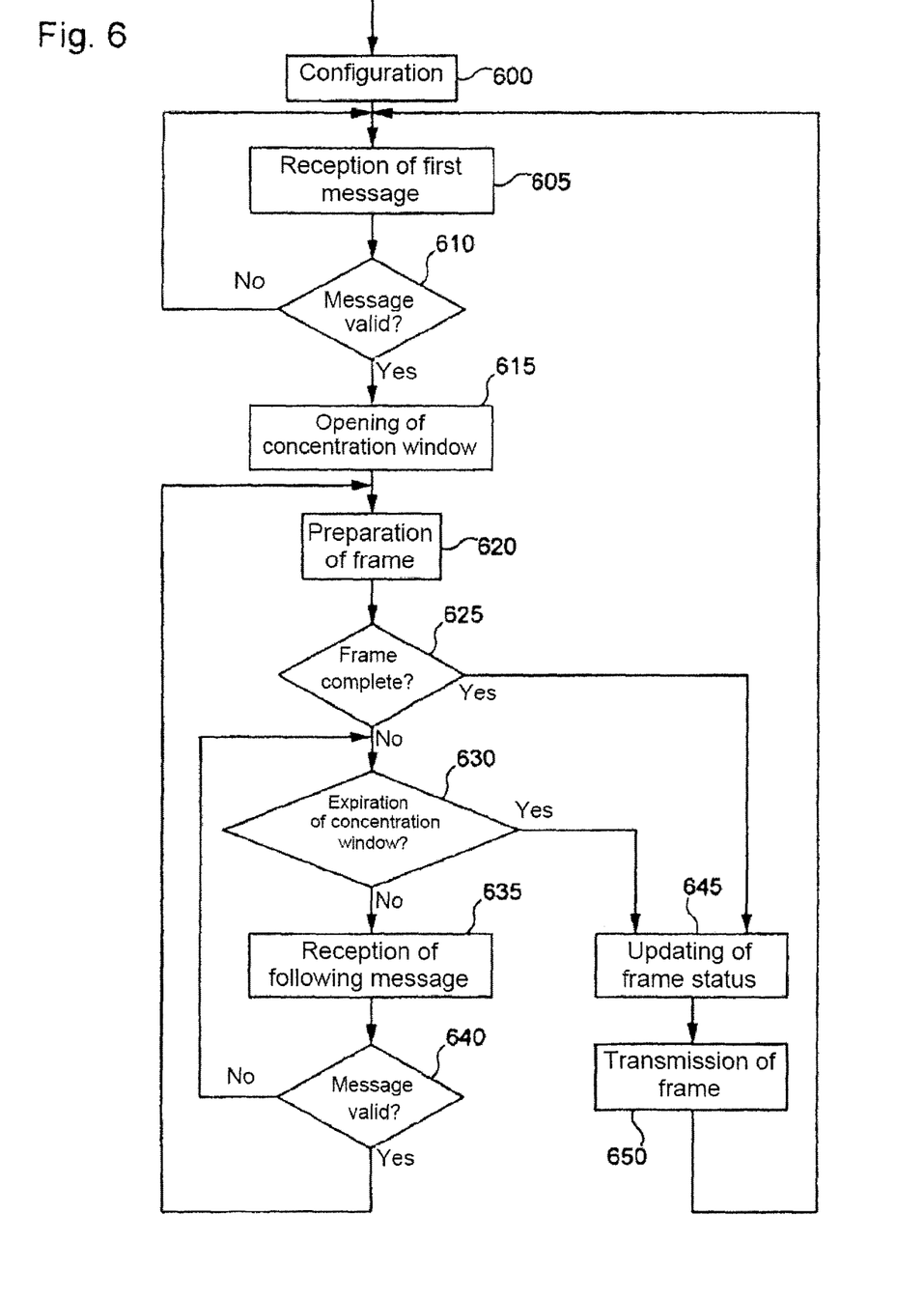
FIG. 6 illustrates an exemplary algorithm implemented in a concentrator in accordance with the invention, for example in the concentrator illustrated on FIG. 2; and, FIG. 7 illustrates an exemplary device adapted for implementing the invention or a part of the invention.

FIG. 6 illustrates an exemplary algorithm implemented in the concentrator, for example in concentrator 200 of FIG. 2.

A first step (step 600) has as an object to configure the concentrator, or one instance of a concentration application, adapted for concentrating several messages in a concentration frame.

This step seeks, in particular, to store the list of identifiers of the messages to be concentrated. For each message to be concentrated, a triplet comprising the identifier of the message, the address of the transmitter node, for example the IP address of the input/output card or of the equipment item comprising the input/output card having transmitted the message, and the length of the useful data received, for example in bytes, is stored. The serial number of each message defined preferably corresponds to the position of the message to be concentrated in the concentration frame. Alternatively, this position can be stored with the information items described above.

The network address of the addressee also is stored in the concentrator. This address advantageously comprises the IP and MAC (abbreviation for Media Access Control in English terminology) addresses in order to be free of the possible implementation of the ARP (acronym for Address Resolution Protocol in English terminology) protocol in order to limit the number of message exchanges.

A concentration identifier also is stored in the concentrator. This identifier is used as an identifier of the concentration frame transmitted by the concentrator. It is linked to the address of the addressee.

The concentrator preferably also stores a concentration time window size making it possible to keep to the cycle time of the simulation. The size of the concentration window advantageously is negligible in relation to the cycle time of the exchanges of messages between the devices connected to the communication network.

When the concentrator is configured, it can receive and concentrate messages. After having received a first message (step 605), a test is conducted to determine whether the message received is valid (step 610). This test can consist, in particular, in verifying that the triplet composed of the identifier of the message, the address of the transmitter node and the size of the useful data is in accordance with the expected values defined during the configuration step.

If the first message received is not valid, the preceding steps are repeated in order to identify a first valid message.

On the contrary, if the message received is valid, the concentration window is open (step 615) taking into consideration the instant at which the first valid message was received. As indicated above, the size of this window is determined during the step of configuration of the concentrator.

A concentration frame then is prepared (step 620). The identifier of this frame is the one stored during the configuration of the concentrator. Likewise, the length of the frame is determined according to the predetermined characteristics of the frame and the length of the messages to be concentrated, stored during the step of configuration of the concentrator. The sequence number and the timestamp are those received in the first valid message. The useful data and the status of the valid message received are stored in the concentration frame, according to the position determined during the step of configuration of the concentrator.

A test then is conducted in order to determine whether the concentration frame is complete (step 625), that is to say, whether the concentrator has received all the messages to be concentrated.

if the concentration frame is not complete, another test is conducted in order to determine whether the concentration window has expired (step 630). This step consists, for example, in comparing the instant at which the test is conducted with the instant of opening of the concentration window to which the size thereof is added.

If the concentration window has not expired, the concentrator takes into account the following message received (step 635). Again a test is conducted in order to determine whether the message is valid (step 640).

Again, this test can consist, in particular, in verifying that the triplet composed of the identifier of the message, the address of the transmitter node and the size of the useful data is in accordance with the expected valued defined during the step of configuration of the concentrator.

Moreover, this test can be used to verify that the sequence number and the timestamp are identical to the sequence number and the timestamp of the concentration frame the initial values of which correspond to those of the first message received in the simulation cycle.

If the sequence number and/or the timestamp of the message received are not identical to the sequence number and the timestamp of the concentration frame, the largest values advantageously are used in the concentration frame. The message received here is considered as partially valid; its status and its useful data can be inserted into the concentration frame. Nevertheless, a partial error indication preferably is generated.

If the message is not valid, the concentrator processes the following message received after having verified that the concentration window has not expired (the algorithm returns to step 630).

If, on the contrary, the message is valid, the concentrator adds the status of the message received, as well as its useful data, to the concentration frame (the algorithm returns to step 620) at the location determined during the configuration step. If necessary, the sequence number and/or the timestamp are modified.

If the concentration frame is complete, its status is updated (step 645) and the concentration frame is transmitted on the communication network (step 650). The status of the concentration frame can be used in particular to indicate the status of the concentrator and/or an error linked to the concentrated messages, for example an error in the sequence number of one or more of the concentrated messages.

Likewise, if the concentration window expires, for example if one or more messages to be concentrated have not been received or if data from the preceding simulation cycle are to be retransmitted, the status of the concentration frame is updated (step 645), indicating the expiration of the concentration window, and the concentration frame is transmitted on the communication network (step 650).

The concentration frame then is reinitialized. The concentrator then can receive and process the messages of the following cycles (step 605).

Although, for reasons of clarity, the examples illustrated are limited to the concentration of several messages in one concentration frame, it must be understood that several concentrators can be used in parallel in order to simultaneously form several concentration frames, in particular concentration frames linked to different groups of input/output cards. The concentrators can be separate hardware devices, separate software applications and/or instances of hardware applications.

Figure 7:
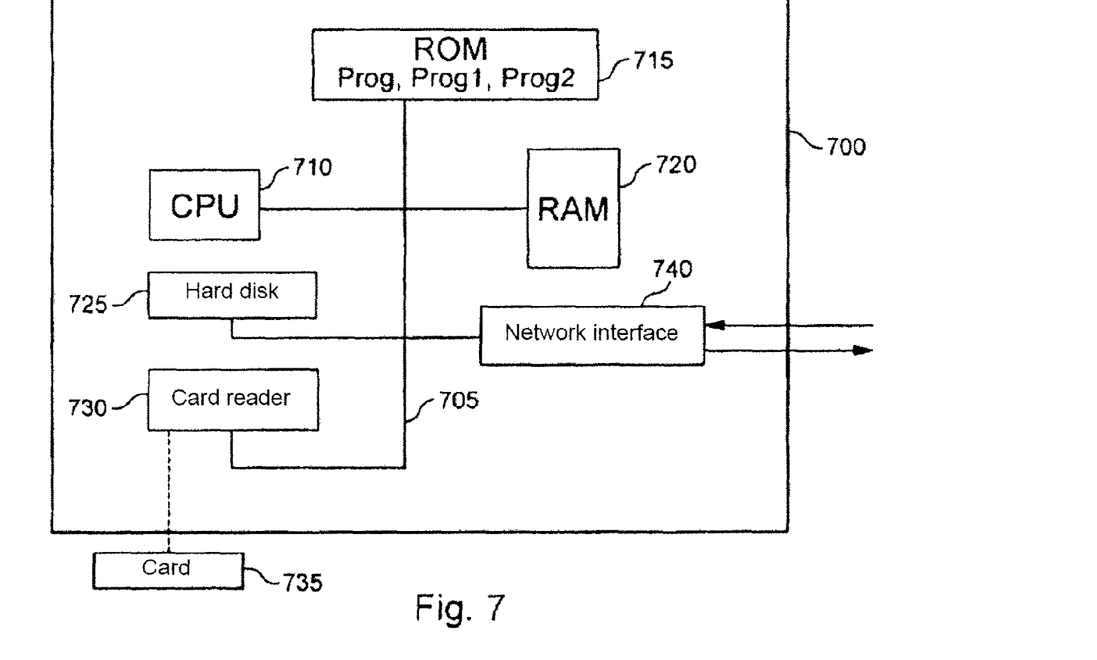

A concentrator adapted for implementing the invention or a part of the invention is illustrated on FIG. 7. The device shown preferably is a standard device, for example a computer or a server.

Device 700 here comprises an internal communication bus 705 to which there are connected:
- a central processing unit or microprocessor 710 (CPU, abbreviation for Central Processing Unit in English terminology);
- a read-only memory 715 (ROM, acronym for Read Only Memory in English terminology) that can comprise the programs necessary for implementation of the invention;
- a random-access memory or cache memory 720 (RAM, acronym for Random Access Memory in English terminology) comprising registers adapted for recording variables and parameters created and modified in the course of execution of the aforesaid programs;

a communication interface 740 adapted for transmitting and receiving data to and from a communication network, for example a switched-type network;

Device 700 preferably also has the following components:

a hard disk 725 that can comprise the aforesaid programs and data processed or to be processed according to the invention; and a memory card reader 730 adapted for receiving a memory card 735 and reading or writing therein data processed or to be processed according to the invention.

The internal communication bus permits communication and interoperability among the different components included in device 700 or connected thereto. The depiction of the internal bus is not limitative and, in particular, the microprocessor is able to communicate instructions to any component of device 700 directly or via another component of device 700.

The executable code of each program permitting the programmable device to implement the processes according to the invention can be stored, for example, on hard disk 725 or in read-only memory 715.

According to a variant, memory card 735 can contain data, in particular a table of correspondence between the events detected and the commands that can be requested, as well as the executable code of the aforesaid programs which, once read by device 700, is stored on hard disk 725.

According to another variant, the executable code of the programs will be able to be received, at least partially, via first communication interface 740, to be stored in a manner identical to that described above.

More generally, the program or programs will be able to be loaded into one of the storage means of device 700 before being executed.

Microprocessor 710 is going to control and direct the execution of the instructions or portions of software code of the program or programs according to the invention, which instructions are stored on hard disk 725 or in read-only memory 715 or else in the other aforesaid storage components. During boot-up, the program or programs that are stored in a non-volatile memory, for example hard disk 725 or read-only memory 715, are transferred to random-access memory 720 which then contains the executable code of the program or programs according to the invention, as well as the registers for storing the variables and parameters necessary for implementation of the invention.

The communication apparatus comprising the device according to the invention also can be a programmed apparatus. This apparatus then contains the code of the computer program or programs for example set in an application-specific integrated circuit, also called ASIC (acronym for Application-Specific Integrated Circuit in English terminology).

Naturally, to satisfy specific needs, an individual competent in the field of the invention will be able to apply modifications in the foregoing description.

The invention claimed is:

1. Method for concentration of at least two messages transmitted by at least two separate transmitters in a communication network to which there are connected the at least two transmitters and a common addressee of at least one useful datum contained in each of the at least two messages, the method comprising:

first creating a first message of the at least two messages, the first message being addressed to the concentration unit, and the first message including an identifier that identifies the common addressee;

second creating a second message of the at least two messages, the second message being addressed to the concentration unit, and the second message including the identifier that identifies the common addressee;

first receiving via the communication network, at a concentration unit, the first message;

second receiving via the communication network, at the concentration unit, the second message;

opening a concentration window with a predetermined duration during the first receiving;

extracting the at least one useful datum contained in each of the at least two messages;

constructing at least one concentration frame including the useful data extracted and the identifier that identifies the common addressee; and transmitting, to the common addressee, the at least one concentration frame at the expiration of the predetermined duration of the concentration window if at least one of the at least two messages is not received, the size of the at least one concentration frame being smaller than a maximum size of data packets exchanged in the communication network, wherein each of the at least two separate transmitters in the communication network is included in a different interface card connected to a different aircraft component of an aircraft being developed.

2. The method according to claim 1 further comprising:
storing, in the concentration unit, identifiers of messages to be concentrated and addresses of message recipients; and
verifying validity of messages received.

3. The method according to claim 1, wherein the at least one concentration frame includes a status indicator, the method comprising a step of evaluating the status.

4. The method according to claim 1, wherein the method is implemented in one of the at least two transmitters or in a device separate from the at least two transmitters and from the at least one addressee.

5. The method according to any one of claims 1, 2, 3, and 4, wherein the communication network is an Ethernet-type network, and the at least two messages and the at least one concentration frame being in accordance with a UDP protocol.

\* \* \* \* \*